Patented Apr. 22, 1947

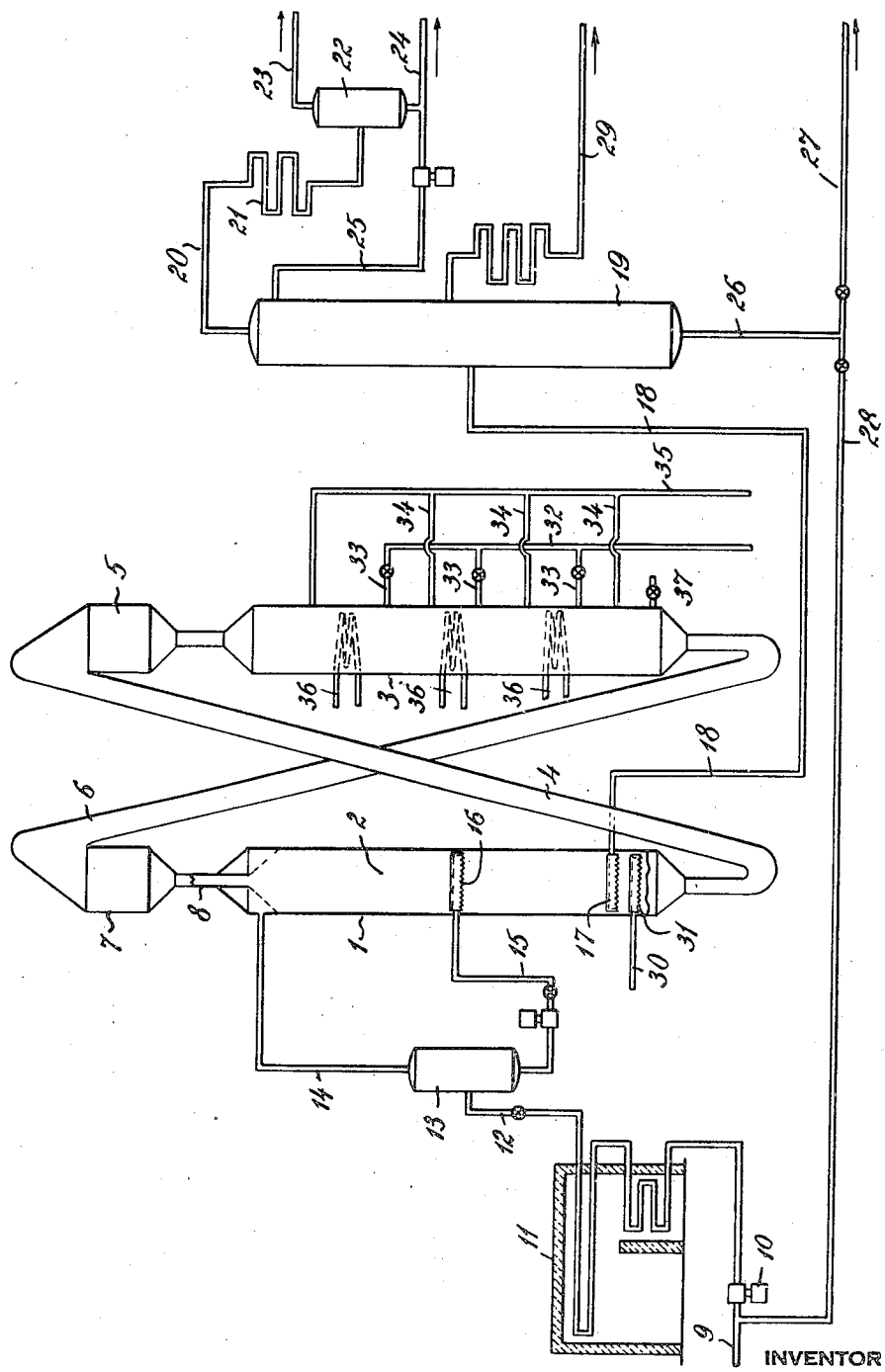

2,419,519

UNITED STATES PATENT OFFICE 2,419,519

CONVERSION OF HYDROCARBONS

Louis P. Evans, Woodbury, N. J., assignor to Socony-Vacuum Oil Company, Incorporated, a corporation of New York Application July 27, 1945, Serial No. 607,476

3 Claims. (Cl. 196—52)

This invention has to do with the conversion of petroleum hydrocarbons to gasoline of high quality in the presence of a solid contact mass. The commercial development of such process has taken three forms. The older one utilizes the contact mass in the form of a fixed bed through which vapors are passed at reaction temperature, which bed when contaminated is removed from reaction and regenerated in situ. A more recent method utilizes the contact mass in the form of quite small particles capable of being carried by and suspended in the reaction vapors and the reaction is carried out in a vessel wherein such contact material is maintained in a condition of hindered settling. Spent contact material withdrawn from this reactor is regenerated by treating with air for combustion under similar physical conditions and returned to the reactor. The third method utilizes the contact mass in particle form, but in particles of larger size, in the form of a moving bed or descending substantially compact column into which the hydrocarbons to be reacted are passed. Spent contact mass material discharged from the bottom of this column is passed through a similar arrangement wherein it is contacted with air for a high temperature regeneration after which it is returned to the reactor. This invention is particularly concerned with operations of this third kind.

In the cracking of heavier high boiling oils, it is often desirable to subject to cracking hydrocarbon materials having a boiling point substantially above the reaction temperature which it is desired to maintain in the reactor. Such heavy hydrocarbons are usually presented to the operation in the form of an oil having a substantial fraction boiling above the desired reaction temperature, and a fraction boiling below the reaction temperature. It has been proposed to achieve the cracking of such products in an operation of this kind by heating the oil charge to a high temperature, but not necessarily to or above the desired reaction temperature and discharging this oil in liquid form into the column of contact mass to be converted therein into products vaporous at the reaction temperature and solid materials deposited upon the contact mass. The products vaporous at the reaction temperature will comprise, of course, gasoline and lighter materials produced by the conversion reaction, and will also include materials of gas oil nature generated by the treatment of the heavy oil in the presence of the contact mass.

In passing it may be noted that the contact masses so utilized partake of the nature of natural or synthetic clays and may comprise natural clays such as fuller's earth, activated clays and synthetic compositions of alumina and/or silica, with or without related materials, produced by any of numerous known means, and may take the form of granules, formed pellets, beads and the like. Such materials may themselves be catalytic to the desired reaction or may be impregnated with or act as carriers or supports for other materials such as certain metallic oxides and the like, which are catalytic or whose presence is desired for the purpose of the reaction.

This particular invention is directed to a method whereby separate degrees of severity may be applied to portions of the original charge stock of different boiling points while still treating all of the charging stock boiling both above and below the desired reaction temperature in the same column of contact mass for purposes and advantages which will be hereinafter explained.

The invention may be understood more readily by reference to the drawing attached to this specification, the single figure of which shows in diagrammatic form, the process set up utilized in the practice of my invention. In this drawing, 1 is a reactor containing a substantially compact downwardly moving column of particle form solid contact mass material designated by numeral 2; 3 is a similarly operated regenerator. Elevator 4 serves to move spent contact mass material from reactor 1 into hopper 5 from whence it is fed through regenerator 3. Elevator 6 moves regenerated contact mass material into hopper 7 from whence it is fed through feed pipe 8 into reactor 1. The above described process of operation is that commercially known as the "TCC Process" and is set forth particularly in the patents of Thomas P. Simpson and associates, such as Simpson, Payne, Crowley Patent No. 2,320,318. Charge oil for the system comprises typically a material of residual nature of long boiling range containing fractions boiling below the desired reaction temperature and a substantial portion boiling above the desired reaction temperature, and is introduced through pipe 9 and is forced by pump 10 through heating coils in furnace 11 wherein it is heated to a temperature near to the desired reaction temperature and sufficient to effect the desired separation into a vapor fraction and a liquid fraction. Passing through pipe 12 into vapor separator 13, this desired separation is effected. The vapors so separated are passed through pipe 14 into contact with the contact mass material in the upper end of column 2. The liquid material so separated is passed through pipe 15 and a distributor 16 into column 2 at a point intermediate its ends. All hydrocarbons, both vapor and liquid, move concurrently with the contact mass material in column 2 and the vaporous products of the treatment are removed from column 2 by means of collector 17 to pass into pipe 18 and through pipe 18 into fractionator 19. In fractionator 19 the products of conversion are separated into a gasoline and lighter fraction, passing through pipe 20 and condenser 21 into gas separator 22. Uncondensed material is removed through pipe 23 to recovery or further processing, gasoline-like product of the conversion is removed from the system through pipe 24 and a portion may be returned through pipe 25 for control of the tower. Materials boiling above desired gasoline-like material are removed from fractionator 19 through pipe 26, to be removed from the system through pipe 27 or returned to conversion through pipe 28. If desired, a side stream of intermediate boiling point may be removed from the system through pipe 29. Returning to the bottom of reactor column 2, a purge material of steam or other inert gas is introduced by pipe 30 to the distributor 31 located near the exit of the reactor for the purpose of preventing the escape from the reactor of hydrocarbon materials other than "coke." Spent contact mass passing through elevator 4 into hopper 5 into regenerator 3 is contacted in regenerator 3 with air for the purpose of burning off the combustible contaminant material deposited upon it. This regeneration air or other suitable oxidizing medium is introduced through the agency of manifold 32 and pipes 33, regeneration fumes being removed through pipes 34 and manifold 35. Temperature control of the regenerator may be had in known manner by fluid heat transfer medium introduced into the regenerator in appropriate cooling coils of indirect heat transfer as shown at 36. A purge gas, if desired, may be introduced near the exit end of the regenerator, as by pipe 37. The hot regenerated contact mass material withdrawn from the regenerator in heated condition is delivered through elevator 6, hopper 7 and feed pipe 8 into the top of the reaction column. The temperature of this material and its quantity together with the temperature of the incoming charge stock are balanced so as to provide a desired amount of heat from both sources to maintain the desired reaction temperature levels within reaction column 2.

This process provides a method whereby stocks having a substantial portion, or even all, boiling above the temperature of reaction, which as is customary in the art, may range between about 800° F. and about 1000° F. can be handled in the presence of a solid compact column of a particle form solid contact mass catalytic to the desired reaction. Not only is it applicable to crude residues, but also to distillate stocks of long boiling range having a large portion boiling above 840–850° F., such as vacuum gas oil from Mid-Continent or Coastal Crudes, or the like.

As is customary in the art, the reaction temperature will be of the same nature as those usually applied, ranging from about 800° F. and 850° F. upwards to temperatures of the order of 950° F. to 1000° F. Catalyst to oil ratios will be of the order of 1 to 6 parts of catalyst by weight to one part of oil. Space velocities, i. e., cubic feet of liquid oil charged (as liquid at 60° F.) per cubic foot of space occupied by catalyst, per hour, will be of the order of 0.5 to 2.0. In general, it is desirable to work at the lower catalyst to oil ratios, for it is known that as this ratio increases, a greater loss to gas and coke is experienced, although the magnitude of these figures is dependent upon catalyst activity, space velocity, and temperature.

In connection with the temperature of materials leaving the furnace, it should be pointed out that it is a well known fact that vapor lines handling heavy hydrocarbons at temperatures above about 840–850° F. tend to coke rapidly, therefore this temperature becomes a practical operating limit particularly when vapor separation is made outside of the contact mass column.

This method is particularly applicable to residual stocks from crude distillation, to vacuum gas oils, and to gas oils having a long heavy end. While such oils are usually analytically distilled under vacuum, it is usual to correct the vapor temperature vs. percent received in such analyses to atmospheric basis. Such corrected analytical data are used herein. When an oil is referred to as "having 25% boiling below 950° F.," that means that when 25% of the charge has been received in an analytical distillation, the vapor temperature, reduced to atmospheric pressure, is 950° F., and similarly.

This process is useful with such charge stocks as vacuum gas oils, having 60% or so boiling above 800° F. With such oils, heating to 800° F. or 850° F. in a pipe still under the usual small back pressure does not permit of substantial vaporization, and when such oils are discharged into a reactor operating at 850° F. to 900° F. and usual reactor pressures, a susbtantial portion of the oil is deposited upon the catalyst as liquid.

The process is most useful for handling residual stocks from distillation of crudes for gas oils, lubricating stocks, and the like. Such oils usually do not have over 25% or so boiling below 900° F., and, obviously, even if heated to a high reaction temperature of the order of 975° F. would still remain largely unvaporized, while heating to such a temperature would produce some undesirable thermally cracked gasoline.

By operating in this manner, I am able to achieve several desirable effects. In many residual stocks of long boiling range, the lighter materials are more refractory than those of higher boiling point. These materials I am able to contact with contact mass of a higher temperature and by virtue of the fact that I pass them through the entire length of the reaction column, I am able to expose them to reaction temperatures for a considerably longer time. Additionally, in the later portion of their travel they are exposed to lower temperatures thus suppressing tendencies toward secondary cracking which might be present were they to be permitted to flow countercurrent to hot contact mass thus exposing materials already of gasoline boiling range to the contact mass of highest temperature with the possibility of thus inducing secondary cracking. Additionally I am able to secure contacting of the liquid portion of the charge with the contact mass material in quantities sufficient to insure breaking of the high boiling materials down into materials of gas oil nature vaporous at the temperature level obtaining within the reactor and by presence of the vaporous materials passing down into the evaporative section of the reactor from above, I am able to secure a more ready carrying of the vapors of gas oil nature so formed into the contact mass for further cracking, a feature which I believe to be of consequence in promoting better operation of a hydrocarbon conversion with the kind of stock and under the conditions outlined.

I claim:

1. The method of converting a heavy, high boiling hydrocarbon oil into high quality gasoline by catalytic cracking in the presence of a particle form solid catalytic contact mass which comprises circulating said contact mass in a closed cyclic path through an enclosed conversion zone and an enclosed regenerating zone, moving said contact mass through said conversion zone in the form of a substantially compact column, heating a charge oil containing a substantial fraction boiling above the desired reaction temperature to a temperature not above about 840° F., separating said charge oil into a vapor portion and a liquid portion, introducing the vapors so formed into said column at a point adjacent its upper end, introducing the liquid so formed into said column at a point intermediate its ends, removing vaporous products of conversion from said column at a point adjacent its lower end and below the point of liquid feed introduction, removing contaminated contact mass from the bottom of said conversion zone while substantially preventing the escape of vaporous hydrocarbon material therewith, subjecting the contaminated contact mass to a combustion regeneration at high temperature, removing the contact mass from regeneration and introducing it in heated condition into said conversion zone, the heat in the said contact mass and the temperature of the charge vapors and charge liquid being proportioned to maintain the conversion zone at a desired reaction temperature between about 800° F. and about 1000° F. and not above the boiling point of said substantial fraction of the charge oil.

2. The method of converting a heavy, high boiling hydrocarbon oil into high quality gasoline by catalytic cracking in the presence of a particle form solid catalytic contact mass which comprises circulating said contact mass in a closed cyclic path through an enclosed conversion zone and an enclosed regenerating zone, moving said contact mass through said conversion zone in the form of a substantially compact column, heating a charge oil containing a substantial fraction boiling above about 840° F. to a temperature not above about 840° F., separating said charge oil into a vapor portion and a liquid portion, introducing the vapors so formed into said column at a point adjacent its upper end, introducing the liquid so formed into said column at a point intermediate its ends, removing vaporous products of conversion from said column at a point adjacent its lower end and below the point of liquid feed introduction, removing contaminated contact mass from the bottom of said conversion zone while substantially preventing the escape of vaporous hydrocarbon material therewith, subjecting the contaminated contact mass to a combustion regeneration at high temperature, removing the contact mass from regeneration and introducing it in heated condition into said conversion zone, the heat in the said contact mass and the temperature of the charge vapors and charge liquid being proportioned to maintain the conversion zone at a desired reaction temperature between about 800° F. and about 1000° F. and not above the boiling point of said substantial fraction of the charge oil.

3. The method of converting a heavy, high boiling hydrocarbon oil into high quality gasoline by catalytic cracking in the presence of a particle form solid catalytic contact mass which comprises circulating said contact mass in a closed cyclic path through an enclosed conversion zone and an enclosed regenerating zone, moving said contact mass through said conversion zone in the form of a substantially compact column, heating a charge oil the major portion of which boils above about 840° F. to separate said charge oil into a vapor portion having a temperature not above about 840° F. and a liquid portion, introducing the vapors so formed into said column at a point adjacent its upper end, introducing the liquid so formed into said column at a point intermediate its ends, removing vaporous products of conversion from said column at a point adjacent its lower end and below the point of liquid feed introduction, removing contaminated contact mass from the bottom of said conversion zone while substantially preventing the escape of vaporous hydrocarbon material therewith, subjecting the contaminated contact mass to a combustion regeneration at high temperature, removing the contact mass from regeneration and introducing it in heated condition into said conversion zone, the heat in the said contact mass and the temperature of the charge vapors and charge liquid being proportioned to maintain the conversion zone at a desired reaction temperature between about 800° F. and about 1000° F. and not above the boiling point of said substantial fraction of the charge oil.

LOUIS P. EVANS.

REFERENCES CITED

The following references are of record in the file of this patent:

UNITED STATES PATENTS

| Number | Name | Date |
| --- | --- | --- |
| 2,304,183 | Layng et al. | Dec. 8, 1942 |
| 2,348,699 | Tuttle | May 9, 1944 |
| 2,356,611 | Peters | Aug. 22, 1944 |
| 2,372,018 | Ruthruff | Mar. 20, 1945 |